9719X
C. Whipple.
Reed for Loom.
Patented Jun. 11, 1836.
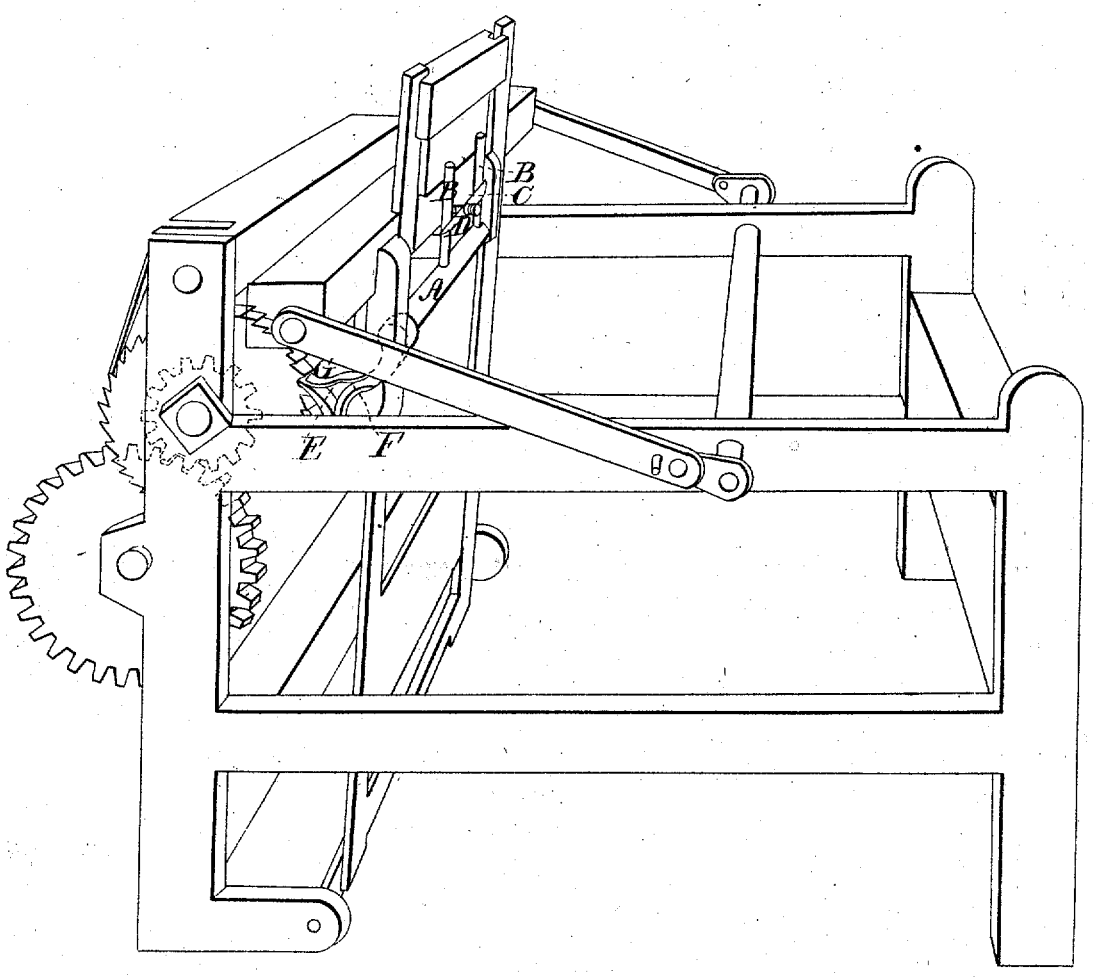
N. PETERS, PHOTO-LITHOGRAPHER, WASHINGTON, D. C.

2434

Cullen Whipple. (Patented 11. June 1836.)

The Schedule referred to in these Letters Patent, and making part of the same, con-
-taining a description in the words of the said Cullen Whipple himself of his improvement in the Take up Rod for
Weaving Looms.

Be it known that I Cullen Whipple of the town of Douglas in the County of Worcester
and State of Massachusetts, have invented a new and useful improvement in the Common Loom, called "Whipple's
improved take up rod" which is described as follows, reference being had to the annexed drawings of the same, making
part of this Specification.

I take a common power Loom and remove all the apparatus for taking up the cloth or moving the cloth beam.
The ratchet wheel, which is usually placed below the cloth beam I place above it to bring it in contact with the catch
hereafter described. The Reed is held in a swing frame on bearings at the top. The Loom is in other respects the same as that
which is used generally. My improvement consists of a rod A which is placed on the backside of the Lathe about three
inches below the lower edge of the reed, hung on the bearings at each end, Upon this rod are two or more arms B.B. or
levers, which bear on the back of the reed frame: the bearing of which arms is regulated by a flat spring C, passing from one
arm to the other, and held in the centre by a bolt D in the lathe which bolt is screwed in or out to regulate the thick-
-ness of the cloth at pleasure, The rod before described has in addition to the levers a spring Catch E attached in a
lever F on one end of the rod. A small spring G presses upon the Catch. This catch is calculated to play on to the teeth
of the ratchet wheel and turn it with the cloth beam for winding up the cloth. This rod may be applied either on
the back or on the front of the Lathe, or on the breast beams but I prefer the backside of the Lathe, as it can be placed
there to greater advantage than in either of the other places. The great object sought from the use of this rod is to keep
the reed parallel, and secure its power throughout its whole length, the motion from the reed frame having been
heretofore taken from one end.

The mode of obtaining the whole power of the reed by the machinery before described, forms the distinguishing
feature of my improvement. In operating a Loom with my take up rod the catch upon the end of the rod is de-
-signed to come in contact with the ratchet wheel in a line with their centres. The catch when the filling is run
out, only comes so far in contact as barely to touch it, but does not move the ratchet wheel. When the filling comes to reed to swing it will vibrate the rod and move the ratchet wheel at the same [illegible] winding up the cloth, and will continue to take up as long as the reed swings the required distance. There being no weight of metal of any consequence the motion of the reed perfectly governs the catch on the ratchet wheel, making the cloth more even, especially when thin cloth, than any other method.

What I claim as my invention, and which I desire to secure by Letters Patent consists in the before described combination of machinery for taking up the cloth in weaving, whether constructed in the precise manner above described, or in any other containing the same principle as herein set forth; particularly the rolling rod or lever with the roller rod or lever purchase acting on the ratchet wheel connected to the end of the cloth beam

Witnesses
Jonathan Sprague }
Lyman Parsons }

Cullen Whipple

Exd. N.G.

(660 words)

Drawing